US009285293B2

(12) United States Patent
Seta et al.

(10) Patent No.: US 9,285,293 B2
(45) Date of Patent: Mar. 15, 2016

(54) TIRE PERFORMANCE PREDICTION METHOD AND METHOD OF DESIGNING TIRE

(75) Inventors: Eisuke Seta, Kodaira (JP); Tatsuya Nakai, Roma (IT); Martin Schneebeli, Davos Dorf (CH); Denes Szabo, Davos Dorf (CH); Henning Loewe, Davos Dorf (CH); Martin Heggli, Davos Dorf (CH); Felix Hempel, Lauf (DE); Matthias Jaggi, Davos Dorf (CH); Jorg Graupeter, Berlin (DE)

(73) Assignees: BRIDGESTONE CORPORATION, Tokyo (JP); WSL INSTITUTE FOR SNOW AND AVALANCHE RESEARCH SLF, Davos Dorf (CH)

( * ) Notice: Subject to any disclaimer, the term of this patent is extended or adjusted under 35 U.S.C. 154(b) by 458 days.

(21) Appl. No.: 13/811,556

(22) PCT Filed: Jul. 22, 2011

(86) PCT No.: PCT/JP2011/066659
§ 371 (c)(1),
(2), (4) Date: Jan. 22, 2013

(87) PCT Pub. No.: WO2012/011551
PCT Pub. Date: Jan. 26, 2012

(65) Prior Publication Data
US 2013/0124172 A1 May 16, 2013

(30) Foreign Application Priority Data
Jul. 23, 2010 (JP) .................................. 2010-166096

(51) Int. Cl.
*G06F 17/50* (2006.01)
*G01M 17/02* (2006.01)
(Continued)

(52) U.S. Cl.
CPC .......... *G01M 17/027* (2013.01); *B60C 99/006* (2013.01); *G01M 17/02* (2013.01);
(Continued)

(58) Field of Classification Search
CPC ... G01M 17/027; G01M 17/02; G01M 17/06; G06F 17/5009; G06F 17/5018; G06F 17/5095; G06F 2217/16; Y02T 10/82; B60C 99/006
USPC ............................................. 703/2, 6; 73/146
See application file for complete search history.

(56) References Cited

U.S. PATENT DOCUMENTS

2003/0055617 A1 3/2003 Iwasaki et al.
2004/0107081 A1* 6/2004 Miyori et al. ..................... 703/6

FOREIGN PATENT DOCUMENTS

EP 1380972 A2 1/2004
JP 2003-191729 A 7/2003
(Continued)

OTHER PUBLICATIONS

Theile, T., et al. "Simulating creep of snow based on microstructure and the anisotropic deformation of ice." Acta Materialia 59.18 (2011): 7104-7113.*
(Continued)

*Primary Examiner* — Dwin M Craig
(74) *Attorney, Agent, or Firm* — Sughrue Mion, PLLC (57) ABSTRACT

Disclosed is a method for predicting tire performance in which a tire model, which comprises a tread pattern capable of imparting deformation by means of ground contact and/or transfer, and a snow model, in which a snow-covered road surface that comes into contact with the tire model is represented, are used to predict tire performance on the snow-covered road surface on the basis of physical quantities that occur in at least either of the tire model and the snow model. The snow model is modeled as an elasto-plastic body or an elastic body, the nonlinearity of the volume compression property of snow is represented by the relationship between the density or volume strain of the snow and the pressure of the snow, and the shear property of the snow is represented by the relationship between the yield stress of the snow and the pressure of the snow.

6 Claims, 8 Drawing Sheets

(51) Int. Cl.
  *B60C 99/00* (2006.01)
  *G01M 17/06* (2006.01)
(52) U.S. Cl.
  CPC ........ *G06F17/5009* (2013.01); *G06F 17/5018* (2013.01); *G06F 17/5095* (2013.01); *G01M 17/06* (2013.01); *G06F 2217/16* (2013.01)

(56) References Cited

FOREIGN PATENT DOCUMENTS

| JP | 2004-42832 A | 2/2004 |
|---|---|---|
| JP | 2004034814 A | 2/2004 |
| JP | 2006-51840 A | 2/2006 |
| JP | 4437884 B2 | 3/2010 |

OTHER PUBLICATIONS

Lee, Jonah H. "Finite element modeling of interfacial forces and contact stresses of pneumatic tire on fresh snow for combined longitudinal and lateral slips." Journal of Terramechanics 48.3 (2011): 171-197.*

Brzoska, Jean-Bruno, et al. "Computation of the surface area of natural snow 3D images from X-ray tomography: two approaches." Image Anal Stereol 20.1 (2001): 306-312.*

Martin Stoffel "Numerical Modeling of Snow using Finite Elements" Printed in Switzerland, Feb. 2006, ISBN 10:3-7281-3064-8, experpts, Chapter 2 "Thermo-mechanical properties of the Alpine Snow Cover"; pp. 11-23.*

Jonah H. Lee, "A new indentation model for snow", Journal of Terramechanics, 2009, pp. 1-13, vol. 46.

S. Shoop et al., "Finite Element Modeling of Tires on Snow", Tire Science and Technology, TSTCA, 2006, pp. 2-37, vol. 34, Issue 1.

George L. Blaisdell et al., "Wheels and Tracks in Snow, Validation Study of the CRREL, Shallow Snow Mobility Model" CRREL Report, 1990, 90-9, 76 pgs.

International Search Report for PCT/JP2011/066659 dated Sep. 6, 2011.

Coleou et al., "Three-dimensional snow images by X-ray microtomography", Annals of Glaciology, 2001, vol. 32, XP-002739841, pp. 75-81.

Communication dated Jun. 12, 2015, issued by the European Patent Office in corresponding European Application No. 11809721.1.

Lee, "Plane Strain Indentation of Snow at the Microscale", Proceedings of the ASME 2008 International Design Engineering Technical Conferences & Computers and Information in Engineering Conference, Aug. 3-6, 2008, XP-002739842, vol. 5, pp. 719-727 (11 pgs. total).

* cited by examiner

Unit : kg/m³

FIG. 9

COMPARISON BETWEEN PREDICTED RESULTS AND MEASURED RESULTS
(SNOW TRACTION TEST USING 195/65R15)

| TIRE CIRCUMFERENTIAL DIRECTION ↔ | PATTERN 1 | PATTERN 2 | PATTERN 3 |
|---|---|---|---|
| PREDICTION BY EXAMPLE | 100 | 130 | 190 |
| PREDICTION BY CONVENTIONAL EXAMPLE | 100 | 110 | 130 |
| ACTUAL MEASUREMENT | 100 | 125 | 180 |

TIRE PERFORMANCE PREDICTION METHOD AND METHOD OF DESIGNING TIRE

CROSS REFERENCE TO RELATED APPLICATIONS

This application is a National Stage of International Application No. PCT/JP2011/066659 filed Jul. 22, 2011, claiming priority based on Japanese Patent Application No. 2010-166096 filed Jul. 23, 2010, the contents of all of which are incorporated herein by reference in their entirety.

TECHNICAL FIELD

The present invention relates to a tire performance prediction method of predicting tire performance on a snowy road surface and to a tire designing method.

BACKGROUND ART

Conventionally, in development of pneumatic tires (simply called tires below when appropriate), a prototype sample of a designed tire is made, mounted on an automobile, and subjected to an evaluation test. Thereby, the performance of the tire, such as traction performance and abrasion resistance, is obtained. When expected tire performance cannot be obtained, a new prototype sample of a tire with a modified design is made and is subjected to an evaluation test, and this procedure is repeated.

Today, due to development in a numerical analysis method, such as a finite element method, and improvement in computing power, the tire performance can be obtained through simulation. Particularly, the performance of a tire on a pavement surface can be obtained through simulation by performing analysis on the load applied by the tire to a rigid road surface and the rolling motion of the tire.

Further, various methods are proposed for predicting tire performance on a snowy road surface through simulation (for example, Non-patent Literature 1). In addition, the traction performance of an automobile on a snowy road surface is evaluated, and a relation between a normal stress applied to snow and the shear strength of the snow is obtained. There is shown a finding that this relation can be expressed in an almost linear representation, irrespective of the difference in types of automobiles, tires, and snowy road surfaces (Non-patent Literature 2).

CITATION LIST

Non-patent Literatures

Non-patent Literature 1: Shoop, S., Kestler, K., and Haehnel, R., "Finite Element Modeling of Tires on Snow", "Tire Science and Technology, TSTCA, Volume 34, Issue 1, pp. 2-37, March, 2006

Non-patent Literature 2: CRREL REPORT 90-9 (USA Cold Regions Research and Engineering Laboratory, CRREL Report 90-9, "Wheels and Tracks in Snow Validation Study of CRREL Shallow Snow Mobility Model)

However, the above-described prediction of tire performance on a snowy road surface through simulation has the following problems. Specifically, in a volume compaction process where snow is hard-packed by the surface pressure of a tire, a relation between the pressure on the snow and the density of the snow shows strong non-linearity. In addition, the property of snow is largely changed by the conditions of snow such as its temperature and hardness (how hard the snow is packed). Accordingly, in tire performance simulation on an actual snowy road surface, results of the tire performance prediction are strongly dependent on the properties of the snow.

For these reasons, the simulation of tire performance on a snowy road surface faces the following problem. Specifically, in numerical modeling of snow and interaction analysis of the snow model and a tire, it is not easy to improve the precision of tire performance prediction. In other words, the problem is that in the simulation of tire performance on a snowy road surface, tire designing-evaluation cycles utilizing numerical analysis techniques are inefficient.

A tire performance prediction method according to the present invention is used for predicting performance of a tire on a snowy road surface based on a physical quantity generated in at least any one of a tire model and a snow model, by using the tire model having a tread pattern deformable by at least one of ground contact and rolling and a snow model representing a snowy road surface to be in contact with the tire model.

The snow model is summarized as to be modeled as an elasto-plastic body or a plastic model, to represent non-linearity of a volume compaction property of snow by a relation between a density of the snow or a volume strain of the snow and a pressure on the snow, and to represent a shear property of the snow by a relation between a yield stress of the snow and a pressure on the snow.

According to the above feature of the present invention, in a snowy-road-surface model represented by the snow model, the non-linearity of the volume compaction property of the snow may be expressed as a polynomial equation or a piece-wise-linear continuous function which is based on the relation between the density of the snow or the volume strain of the snow and the pressure on the snow.

According to the above feature of the present invention, in the snowy-road-surface model represented by the snow model, the shear property of the snow may be expressed as a linear function based on the relation between the yield stress of the snow and the pressure on the snow.

According to the above feature of the present invention, the snow model may be created by the steps of: stratifying a snow alone according to at least one of a hardness of the snow alone and a temperature of the snow alone, under a test condition which allows a deformation speed of snow to be substantially the same as that in a tire use condition through an indoor test of snow alone; and determining parameters for specifying the volume compaction property and the shear property of the snow by using the stratified snow alone.

According to the above feature of the present invention, in the step of stratifying the snow alone, tomographic images of the snow alone taken by an internal three-dimensional image analysis device and three-dimensional information which is a result of processing on the tomographic images may be used as a microscopic structure of the snow alone.

The present invention is summarized as a method of designing tire comprising the steps of: predicting performance of a tire on a snowy road surface through numerical analysis by using the tire performance prediction method; modifying a design draft of the tire targeted for the tire performance prediction method, based on the predicted tire performance; and re-predicting performance of a tire, which is based on the modified design draft, on the snowy road surface through numerical analysis.

BRIEF DESCRIPTION OF THE DRAWINGS

FIG. 5 also shows an image of snow structure.

DESCRIPTION OF EMBODIMENTS

Next, an embodiment of a tire performance prediction method and a method of designing tire according to the present invention is described with reference to the drawings. Note that the same or similar reference numerals denote the same or similar elements and portions throughout the drawings. In addition, it should be noted that the drawings are schematic and that ratios of dimensions and the like are different from actual ones.

Therefore, specific dimensions and the like should be determined in consideration of the following description. Moreover, the drawings may also include portions having different dimensional relationships and ratios from each other.

(1) Overview of the Method of Designing Tire

Figure 1:
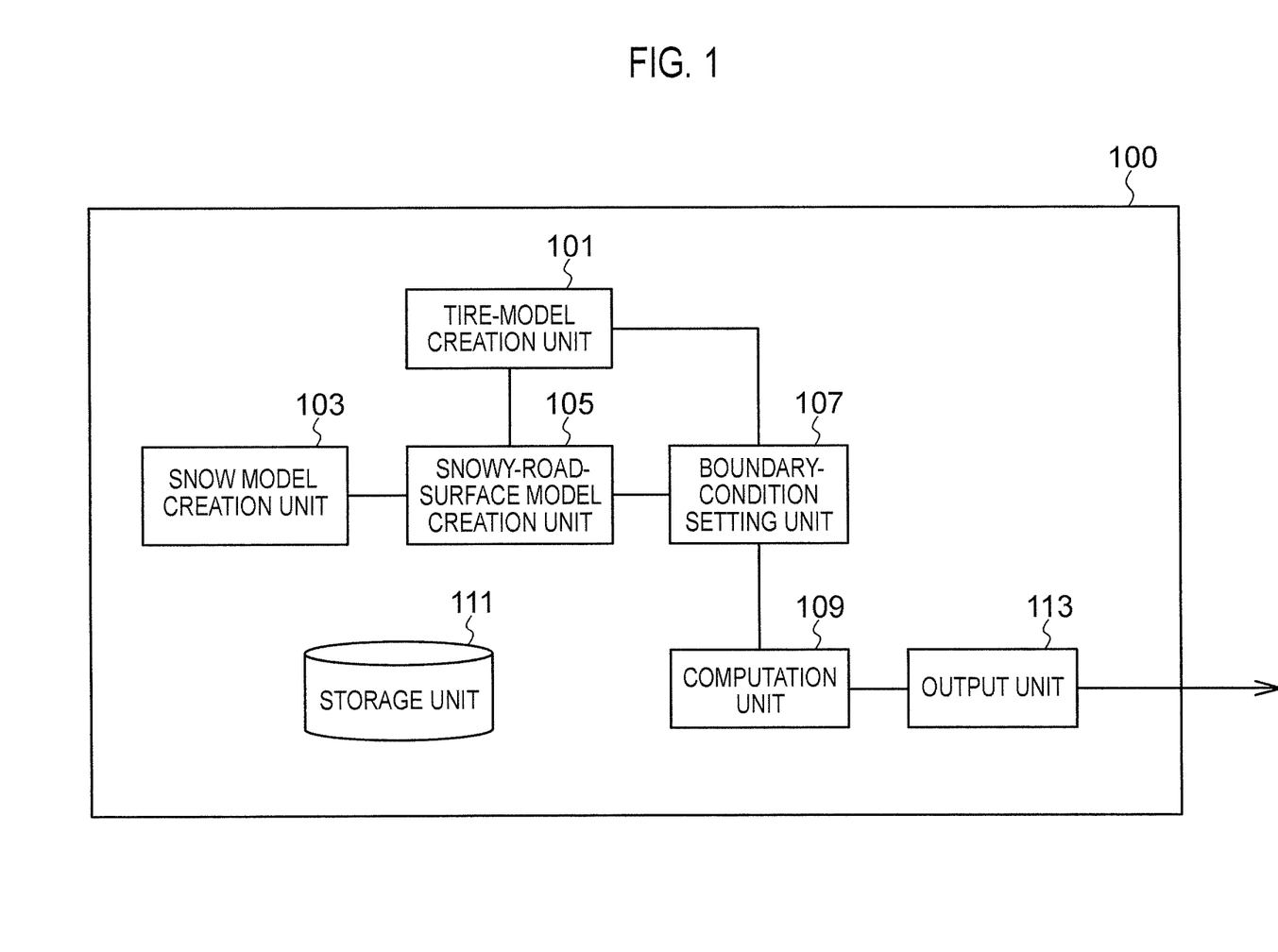
FIG. 1 is a functional block diagram showing the configuration of a tire performance prediction system 100 executing a tire performance prediction method according to an embodiment of the present invention.

First, an overview of a tire performance prediction method and a method of designing tire according to this embodiment is described. Specifically, descriptions are given of: (1.1) the functional block configuration of a system executing the tire performance prediction method and (1.2) the flow of tire performance prediction.
(1.1) Functional Block Configuration of the System Executing the Tire Performance Prediction Method FIG. 1 is a diagram showing the function block configuration of a tire performance prediction system 100 configured to execute the tire performance prediction method according to this embodiment. The tire performance prediction system 100 is configured to predict the performance of a tire on a snowy road by using a tire model 200 and a snow model 310 (see FIG. 4).

The tire performance prediction system 100 includes a tire model creation unit 101, a snow model creation unit 103, a snowy-road-surface model creation unit 105, a boundary-condition setting unit 107, a computation unit 109, a storage unit 111, and an output unit 113.

Figure 4:
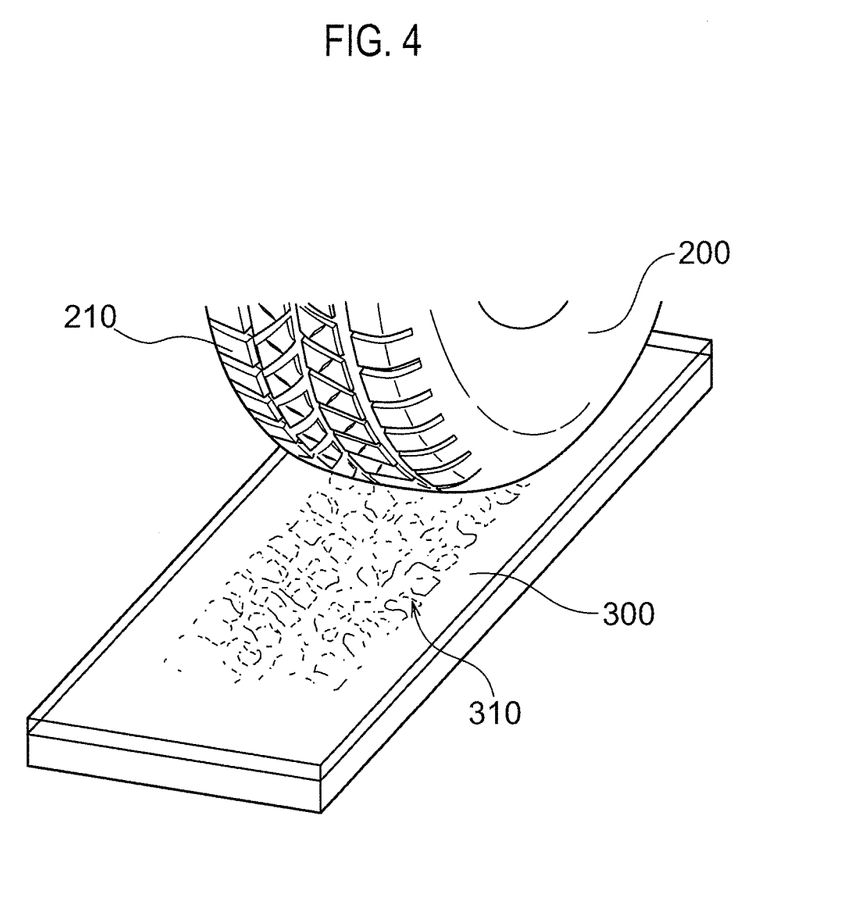
FIG. 4 is a diagram showing a tire model 200 and a snowy-road-surface model 300 represented using the snow model 310 according to the embodiment of the present invention.

The tire model creation unit 101 is configured to create the tire model 200. FIG. 4 shows the tire model 200 and a snowy-road-surface model 300 represented by use of the snow model 310.

The tire model 200 has a tread pattern 210 deformable by at least one of contact with the ground and rolling.

The snow model creation unit 103 is configured to create the snow model 310. The snow model 310 represents a snowy road to be in contact with the tire model 200, or specifically, with the tread pattern 210.

The snow model 310 is modeled as an elasto-plastic body or a plastic body. The snow model 310 represents non-linearity of the volume compaction property of snow by a relation between the density of the snow or the volume strain of the snow and a pressure on the snow. The snow model 310 also represents the shear property of the snow by a relation between the yield stress of the snow and a pressure on the snow.

The snowy-road-surface model creation unit 105 is configured to create the snowy-road-surface model 300. In the snowy-road-surface model 300 represented by the snow model 310, the non-linearity of the volume compaction property of snow is represented by a polynomial equation or a piecewise-linear continuous function, which is based on a relation between the density of the snow or the volume strain of the snow and the pressure on the snow.

Further, in the snowy-road-surface model 300 represented by the snow model 310, the shear property of snow is represented by a linear function which is based on a relation between the yield stress of the snow and the pressure on the snow.

The boundary-condition setting unit 107 is configured to set various conditions such as a friction coefficient, external force and restriction applied to the tire model 200 and the snowy-road-surface model 300.

The computation unit 109 is configured to execute computation (simulation) of tire performance by using the tire model 200 and the snowy-road-surface model 300. Specifically, the computation unit 109 executes various computations by using the tire model 200 and the snow model 310, and predicts the performance of a tire on a snowy road based on a physical amount produced in at least one of the snow model 310.

Note that the method described in Japanese Patent No. 4437884 by the present applicant can be used when appropriate to set the boundary conditions of the tire model 200 and the snowy-road-surface model 300 and to model the snow model 310 as an elasto-plastic body or a plastic body to perform interaction calculation of the tire model 200 and the snow model 310.

The storage unit 111 is configured to store various tire models 200 and snowy-road-surface models 300. The storage unit 111 is also configured to store various pieces of data used by the boundary-condition setting unit 107 and computation results obtained by the computation unit 109.

The output unit 113 is configured to output a result of tire performance simulation computed by the computation unit 109.

(1.2) Flow of Tire Performance Prediction

Next, the flow of tire performance predication by the tire performance prediction system 100 is described. Specifically, descriptions are given of: (1.2.1) a flow of creating the snow model and (1.2.2) a flow of tire performance prediction and of designing tire.

(1.2.1) Flow of Creating the Snow Model

Figure 2:
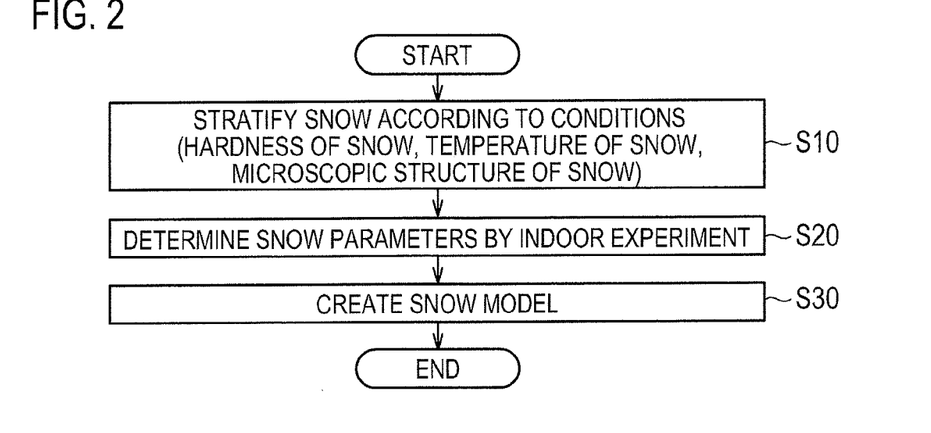
FIG. 2 is a diagram showing a flow of creating a snow model 310 according to the embodiment of the present invention.

FIG. 2 shows the flow of creating the snow model 310. As shown in FIG. 2, in Step S10, by performing an indoor test using real snow alone, the tire performance prediction system 100 determines test conditions which allow a deformation speed of snow to be substantially the same as in the tire's use conditions. Also, the tire performance prediction system 100 stratifies the snow alone according to the hardness of the snow alone, the temperature of the snow alone, or the microscopic structure of the snow.

In the step of stratifying the snow alone, tomographic images of the snow alone taken by an internal three-dimensional image analysis device and three-dimensional information which is obtained by performing processing on the tomographic images can be used as the microscopic structure of snow alone.

Figure 5:
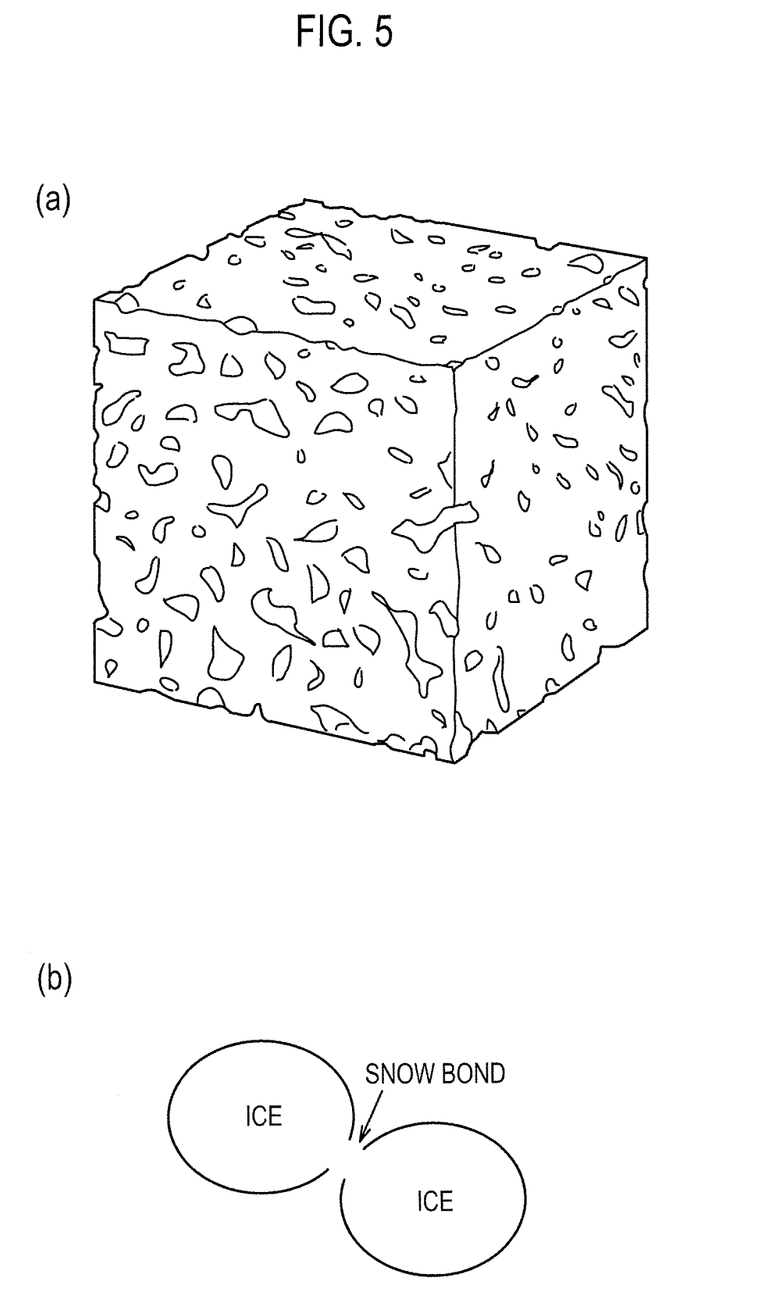
FIG. 5 is a diagram showing an analytic three-dimensional image of snow obtained by taking tomographic images of the snow by use of an X-ray CT scanner and reconstructing the internal three-dimensional information of the snow by use of a computer.

FIG. 5(a) shows a three-dimensional analysis image of snow obtained by taking tomographic images of the snow by use of an X-ray CT scanner and then reconstructing the internal three-dimensional information of the snow by use of a computer, and FIG. 5(b) shows an image of snow structure. When the internal three-dimensional image analysis device, such as an X-ray CT scanner, is used to measure snow, the microscopic structure of the snow can be accurately obtained, and therefore can be used for snow quality stratification.

Note that such a method for internal three-dimensional image analysis is not limited to the X-ray CT imaging. MRI (magnetic resonance imaging) or an imaging technique using neutrons can also be used.

In Step S20, the tire performance prediction system 100 uses the snow alone thus stratified to determine parameters for specifying the volume compaction property of the snow alone and the shear property of the snow.

In Step S30, the tire performance prediction system 100 creates the snow model 310 using the snow along stratified and the parameters determined. The details of the snow model 310 will be described later.

(1.2.2) Flow of Tire Performance Prediction and Flow of Designing Tire

Figure 3:
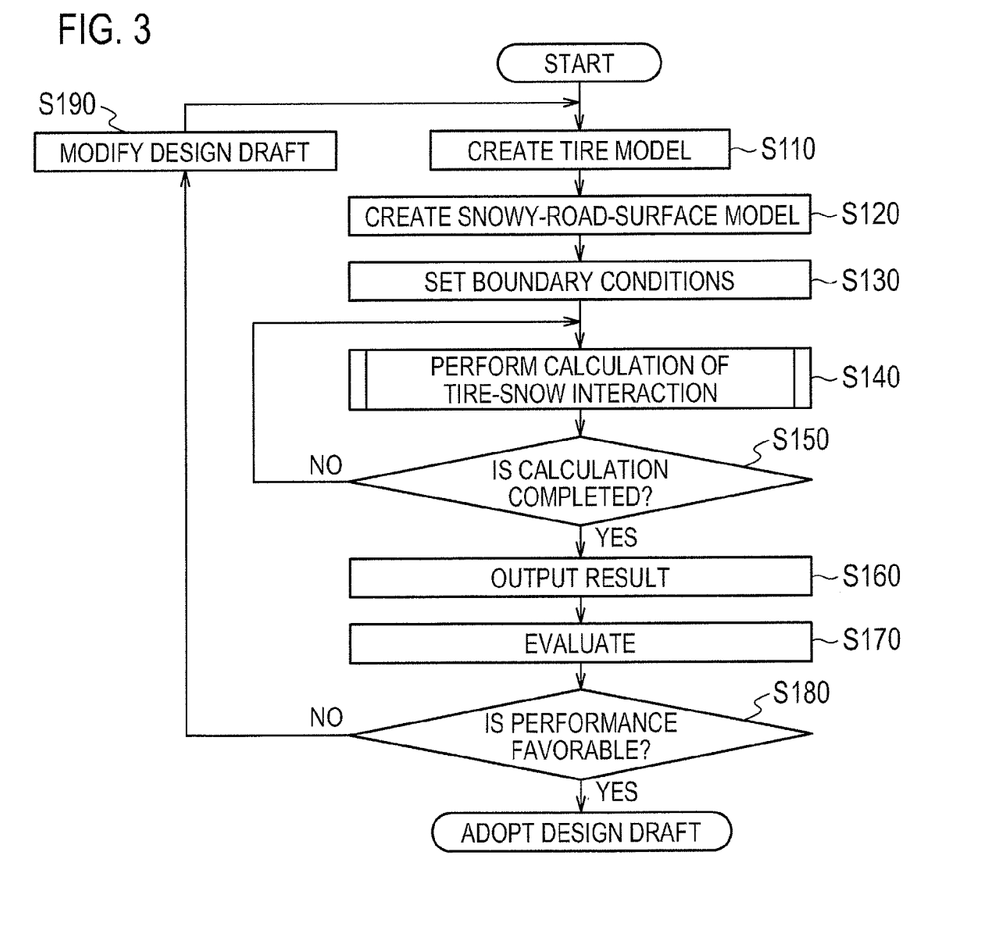
FIG. 3 is a diagram showing a tire performance prediction flow and tire designing flow according to the embodiment of the present invention.

FIG. 3 shows a flow of tire performance prediction and a flow of designing tire. As shown in FIG. 3, the tire designing flow according to this embodiment includes the steps of: predicting the performance of a tire on a snowy road surface through numerical analysis by using the tire performance prediction method which uses the tire model 200 and the snowy-road-surface model 300; modifying a design draft of the tire targeted for the tire performance prediction method, based on the predicted tire performance; and re-predicting the performance of a tire, which is based on the modified design draft, on a snowy road surface through numerical analysis. A detailed description is given below using FIG. 3.

In Step 110, the tire performance prediction system 100 creates the tire model 200. The tire model 200 can be created using the method described in the above-mentioned patent literature (Japanese Patent No. 4437884).

In Step S120, the tire performance prediction system 100 creates the snowy-road-surface model 300. Details of the snowy-road-surface model 300 will be described later.

In Step S130, the tire performance prediction system 100 sets boundary conditions for the tire model 200 and the snowy-road-surface model 300.

In Step S140, the tire performance prediction system 100 uses the tire model 200 and the snowy-road-surface model 300 to execute calculation of tire-snow interaction.

In Step S150, the tire performance prediction system 100 determines whether the calculation of tire-snow interaction is completed or not.

When the calculation of tire-snow interaction is completed (YES in Step S150), in Step S160 the tire performance prediction system 100 outputs a simulation result of the tire performance which is based on the interaction calculation.

In Step S170, the tire performance prediction system 100 evaluates the simulation result of the tire performance. Specifically, the tire performance prediction system 100 evaluates whether the obtained simulation result shows desired tire performance or not.

In Step S180, the tire performance prediction system 100 determines whether the tire performance based on the simulation result is favorable or not.

When the tire performance is favorable (YES in Step S180), the tire performance prediction system 100 adopts the tire design draft employed for the tire model 200 used in the simulation.

On the other hand, when the tire performance is not favorable (NO in Step S180), in Step S190 the tire design draft employed in the creation of the tire model 200 is modified, and the processing from Steps S100 to S170 is repeated.

(2) Creation of the Snow Model 310 and the Snowy-Road-Surface Model 300

Next, a description is given of creation of the snow model 310 and the snowy-road-surface model 300.

(2.1) Basic Configuration

In the above-described tire designing through the tire performance simulation, the snow model 310 and the snowy-road-surface model 300 which can improve the accuracy of the tire performance prediction are essential. Points improved from the tire performance prediction method described in the above-mentioned patent literature (Japanese Patent No. 4437884) are mainly described below.

As already described, in this embodiment, the snow model 310 is modeled as an elasto-plastic body or a plastic body. The snow model 310 represents the non-linearity of the volume compaction property of snow by the relation between the density of the snow or the volume strain of the snow and a pressure on the snow. The snow model 310 also represents the shear property of the snow by the relation between the yield stress of the snow and the pressure on the snow.

When receiving a load, snow undergoes a change in its internal structure (structure formed by cavities and ice crystals) and thus deforms, but does not restore its initial form even if the load is removed. Accordingly, to represent such a characteristic as a numerical model, the snow model 310 is formed as a plastic body. Further, a character of an elastic body is given to the snow model 310 if needed so that the snow model 310 is modeled to exert an appropriate reactive force when receiving a load.

Moreover, the reason why the volume compaction property of snow represents the non-linearity by the relation between the density of the snow or the volume strain of the snow and the pressure on the snow is as follows. As shown in FIGS. 5(a) and 5(b), snow has a structure formed by cavities and ice crystals. Accordingly, as long as snow remains snow, the density of snow never exceeds that of ice (920 kg/cm$^3$) no matter how much it is compacted, and therefore there is an upper limit of the snow density in a volume compaction process where the snow is hard-compacted by pressure.

Further, early in the compaction process, since the microscopic structure of snow is formed by cavities and ice crystals, snow bonds (see FIG. 5(b)), which are boundaries at which the ice crystals bond to one another, are fractured and easily compacted even with a weak pressure. Due to factors such as the one just described, the relation between the pressure on the snow and the density of the snow shows non-linearity which is strongly depending on the microscopic structure of the snow.

Furthermore, being a viscoelastic material, snow is mainly subjected to creep deformation when the deformation speed is low, and to brittle fracture when the deformation speed is high. Tire-snow interaction occurs in an area experiencing a high deformation speed. Accordingly, to accurately measure the fracture strength of the snow bonds, the physical property of snow must be measured with a sufficiently high deformation speed, which is related to the tire-snow interaction.

Further, as shown in the patent literature (Japanese Patent No. 4437884), receiving no load, fresh snow is known to have only an extremely small fracture strength, but to increase in its fracture strength when being hard-compacted. To represent such a characteristic with a numerical model, it is effective to represent the shear property of snow by the relation between the yield stress of the snow and the pressure on the snow.

(2.2) Specific Configuration 1

In this embodiment, in the snowy-road-surface model 300 represented by the snow model 310, the non-linearity of the volume compaction property of snow is expressed by a polynomial equation or a piecewise-linear continuous function which is based on a relation between the density of the snow or the volume strain of the snow and the pressure on the snow.

The non-linearity of the volume compaction property of snow is unique to the conditions of snow to be measured. Accordingly, to improve the accuracy of the snow model 310, it is necessary to accurately stratify the snow, to precisely measure the volume compaction property of the snow, and to faithfully reflect the result in the snow model 310. By precisely measuring the volume compaction property of snow in an indoor test, and by representing a result of the measurement directly in a polynomial equation or a piecewise-linear continuous function, the snow model 310 matching with the conditions of snow can be created with high accuracy.

If the measurement result of the volume compaction property of snow is expressed by a polynomial equation, the measurement result of the volume compaction property of snow should preferably be expressed by a polynomial equation of three or more terms. More preferably, the measurement result of the volume compaction property of snow should be expressed by a polynomial equation of four or more terms. Alternatively, the measurement result of the volume compaction property of snow may be expressed by a Fourier series.

If the measurement result of the volume compaction property of snow is represented by a piecewise-linear, continuous function, a continuous function should preferably be sectioned in a unit of 0.1 MPa or smaller in a section closer to the ground contact surface of the tire, i.e., in a section where a stress of 0.5 MPa or smaller is applied to snow. Alternatively, the continuous function should preferably be sectioned in a unit of 0.05 MPa or smaller in a section where a stress of 0.5 MPa or smaller is applied to snow.

As for a section where a stress of larger than 0.5 MPa is applied to snow, the continuous function should preferably be sectioned in a unit of 0.3 MPa or smaller or 1.0 MPa or smaller according to a piece where the volume compaction property is representable, for example, the strength of the non-linearity of the volume compaction property.

(2.3) Specific Configuration 2

In this embodiment, in the snowy-road-surface model 300 represented by the snow model, the shear property of snow is represented by a linear function which is based on the relation between the yield stress of the snow and the pressure on the snow.

As is similar to the volume compaction property of snow, the shear property of snow is strongly dependent on the fracture strength of the snow bonds, and is therefore strongly dependent on the microscopic structure of snow. Accordingly, in order to improve the accuracy of the snow model 310, the snow model 310 matching with the conditions of snow can be precisely created by making the snow model 310 represent the relation between the yield stress of the snow and the pressure on the snow.

(2.4) Specific Configuration 3

In this embodiment, the snowy-road-surface model 300 is created by the steps of: (i) through an indoor test of snow alone, stratifying the snow alone according to its hardness or temperature under test conditions which allow a deformation speed of snow to be substantially the same as in the tire's use conditions and (ii) by use of the stratified snow alone, determining parameters for specifying the volume compaction property of the snow alone and the shear property of the snow.

As descried above, the volume compaction property and the shear property of snow are strongly dependent on the conditions of the snow. Further, precise measurement of parameters for them is essential in order to improve the accuracy of the snow model 310.

To this end, a result of an indoor test of snow alone, by which snow samples having an even physical property of snow can be obtained, is used for the determination of the parameters. Thereby, a repeated experiment having high reproducibility can be performed to be able to determine accurate parameters. Further, by carrying out the indoor test of snow alone under test conditions allowing a sufficiently high deformation speed that can be considered to be substantially the same as in the tire use conditions, accurate parameters can be determined considering the brittle fracture of the snow bonds owing to the viscoelastic property of snow.

Moreover, the hardness of snow and the temperature of snow are used as the conditions of snow, and the experiment is carried out under these conditions. Thereby, a repeated experiment with high reproducibility can be carried out under the conditions of snow which can be considered as substantially the same conditions; therefore, accurate parameters can be determined.

For quantification of the hardness of snow, a compaction tester (a CTI Compaction Gauge manufactured by Smitheres in the United States), a Kinoshita-style hardness gauge (a utility model proposed by Seiichi Kinoshita), a rammsonde (a ram hardness gauge), or the like can be used. Alternatively, a penetration force into snow and the resistance of the snow against the penetration may be successively measured.

For quantification of the temperature of snow, the surface temperature of the snow, the internal temperature of the snow, the room temperature of the laboratory whose temperature is controlled to have a constant value, or the like may be used. As a thermometer, a thermocouple, a resistance thermometer, a radiation thermometer, or the like can be used.

Figure 6:
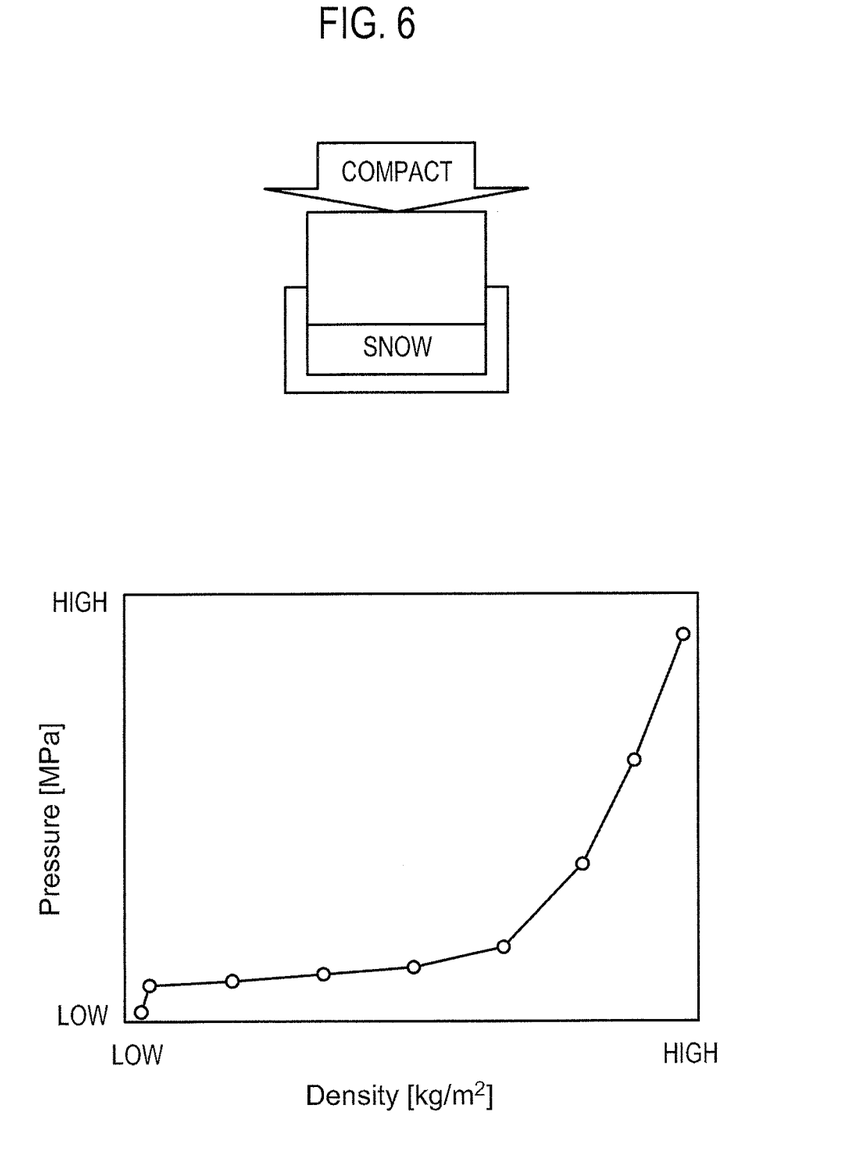
FIG. 6 is a diagram showing the volume compaction property (density-pressure relation) of example snow (hard compacted, −6° C.).

For quantification of the volume compaction property of snow, the following method may be used. Specifically, a sample of snow is put in a cylindrical container, and a compaction force is applied evenly to the entire sample with the container being fixed (see FIG. 6), and the relation between the density of the snow and the pressure applied thereto is measured. Note that the density can be measured from the ratio between the initial volume and the volume after deformation and from the weight excluding the container. The density may be replaced with the volume strain of snow. FIG. 6 shows the volume compaction property (density-pressure relation) of example snow (hard compacted, −6° C.).

Figure 7:
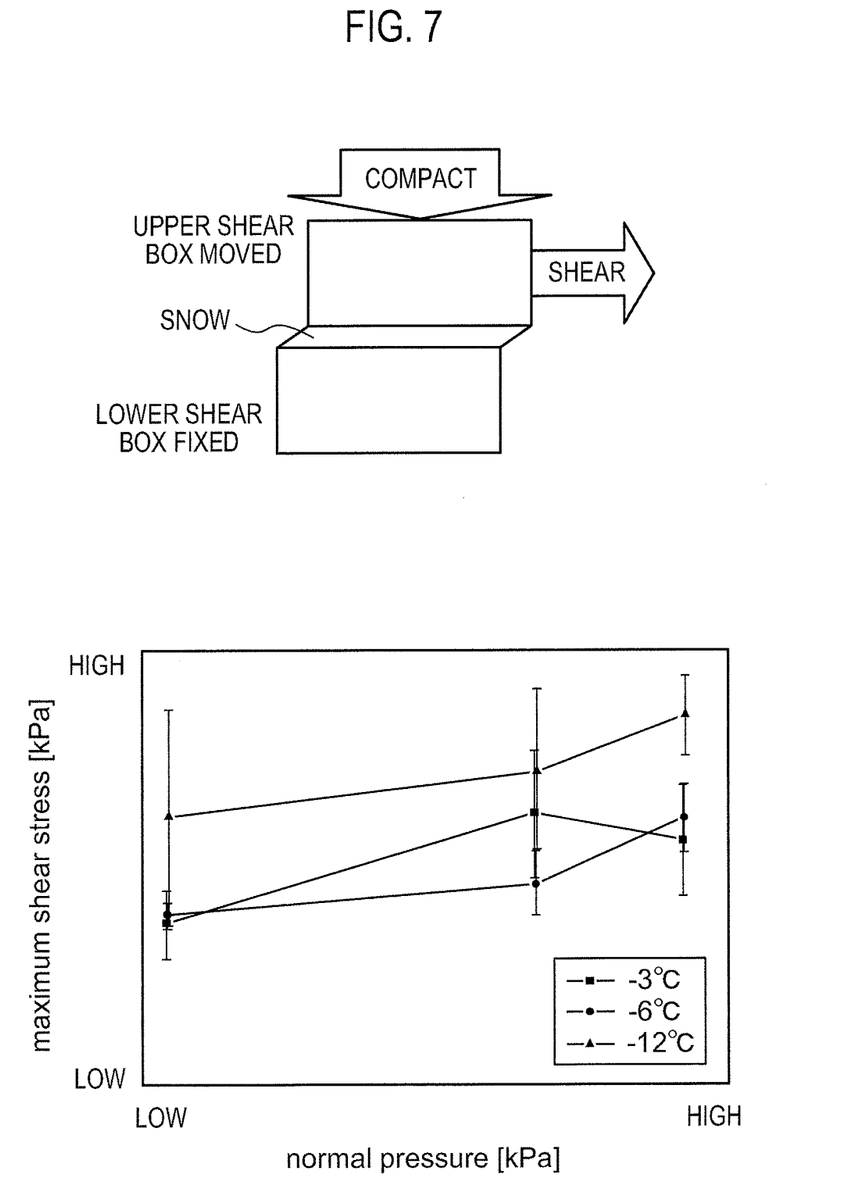
FIG. 7 is a diagram showing the shear property (pressure-shear strength relation) of example snow (hard compacted, on a temperature basis).

For quantification of the shear property of snow, a direct shear test of snow (shear box test) can be used (see FIG. 7). Specifically, with a compaction force being applied, shear deformation is given to the snow by changing relative positions of an upper box and a lower box, and the shear property of the snow in between the upper box and the lower box is measured. The compaction force thus applied acts as a pressure against the snow, and the maximum shear stress generated by the shear deformation is set to the shear strength or yield stress of the snow. FIG. 7 shows the shear property (pressure-shear strength relation) of example snow (hard compacted, on a temperature basis). It should be noted that, in an example, the simulation is carried out with an actual measurement value of the shear property of snow (see FIG. 7) being approximated to a linear function.

Figure 8:
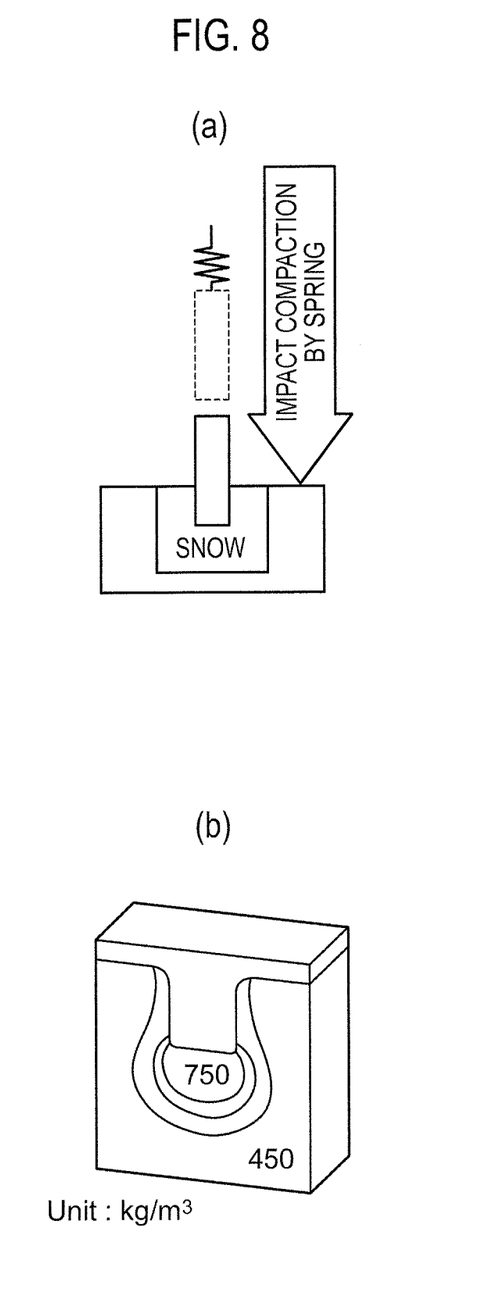
FIG. 8 is a diagram showing a change in the density which is caused by a high-speed compaction of the snow.

In addition, FIGS. 8(a) and 8(b) show a change in the density which is caused by a high-speed compaction of the snow. As shown in FIG. 8(a), in actual measurement, a spring-loaded impact body is used to give high-speed compaction deformation to hard compacted snow. The snow density before deformation was 450 kg/m$^3$, and the density immediately under the impact body increased to 750 kg/m$^3$.

The snow bonds are fractured in the surface layer of the snow immediately under the impact body. On the other hand, contact between fractured ice particles makes it hard for the density in a lower layer to increase. In other words, the high density part is concentrated in the surface layer in an area immediately under the impact body. This is an example indicating that the deformation speed of snow strongly affects the physical property and the deformation result of the snow. When the deformation speed is low, the layer under the impact body is evenly compressed. Accordingly, the high density part is not concentrated in the surface layer.

(3) Example

Next, an example of simulation of tire performance by use of the above-described tire performance prediction method is shown. The rim and internal pressure of a tire according to the example were set according to an applicable rim and a correspondence table between pneumatic pressure and load capability which correspond to the size of a radial-ply tire and are specified in JATMA (Japan Automobile Tyre Manufacturers Association Specification) YEAR BOOK (2009).

Tires of the example have a size of 195/65R15 and different tread patterns in their center three land portions: Pattern 1 has neither grooves nor sipes, Pattern 2 has grooves and no sipes, and Pattern 3 has both grooves and sipes.

Figure 9:
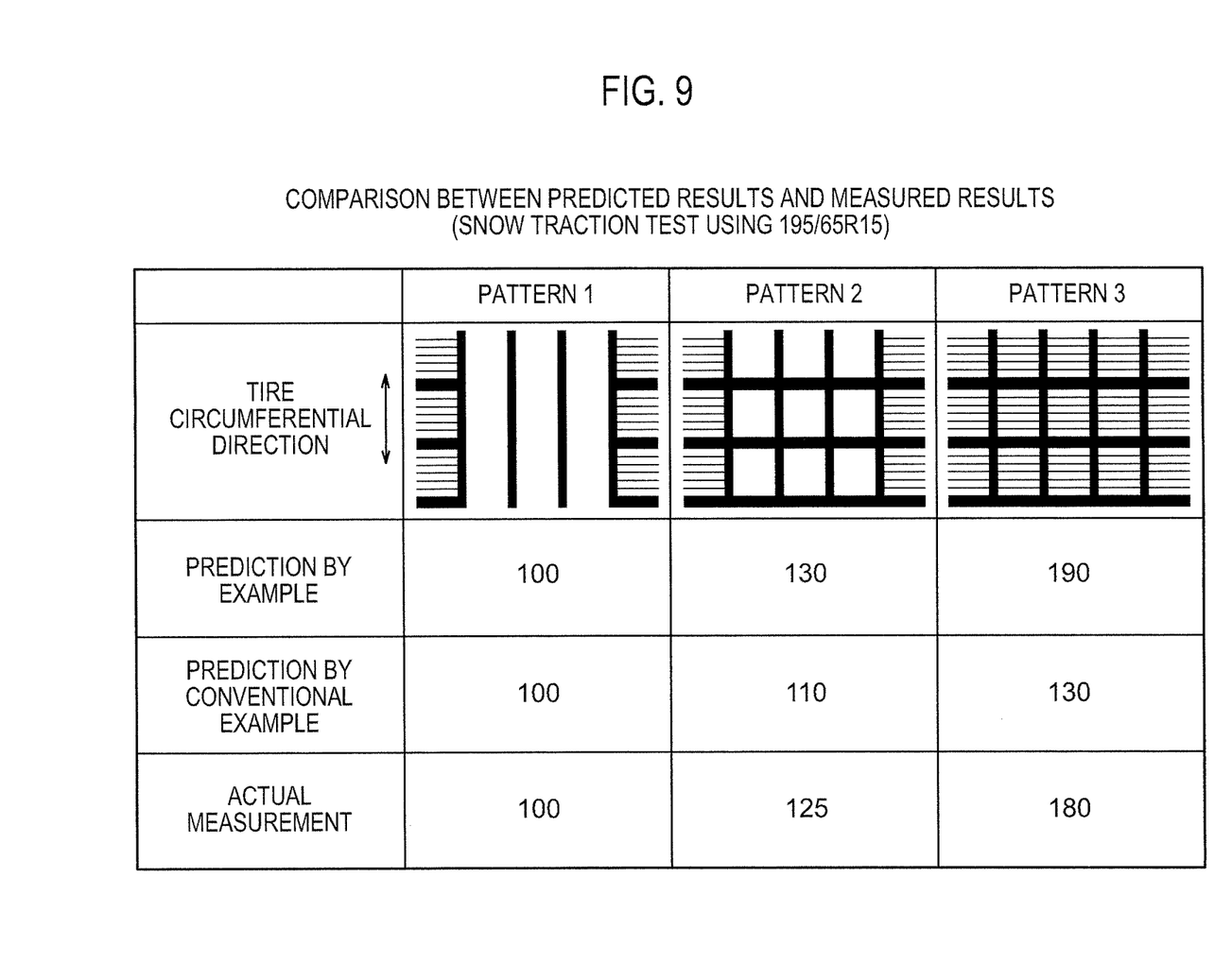
FIG. 9 is a diagram showing a comparison between actual measurement results and tire performance prediction results obtained by the tire performance prediction method.

FIG. 9 shows a comparison between actual measurement results and tire performance prediction results obtained by the above-described tire performance prediction method. "Conventional Example" shows results of prediction based on the tire performance prediction method described in the above-mentioned patent literature (Japanese Patent No. 4437884). In "Actual Measurement," the prototype sample tires were attached to a rim of 6J-15, given an internal pressure of 200 kPa, and were mounted on an automobile. Then, the tires were run for a startup test on a snowy road.

In the startup test, the automobile in a resting state is made to start moving at full throttle, and time that elapsed before travelling 50 meters was predicted or measured. The numerical values are represented by index numbers with Conventional Example being set to 100.

(4) Advantageous Effects

As shown in FIG. 9, prediction obtained by the example is close to the actual measurement values. In the tire performance prediction method according to this embodiment, the snow model 310 is modeled as an elasto-plastic body or a plastic body. The snow model 310 represents non-linearity of the volume compaction property of snow by the relation between the density of the snow or the volume strain of the snow and a pressure on the snow, and represents the shear property of snow by the relation between the yield stress of the snow and a pressure on the snow.

Accordingly, tire performance simulation can be carried out with conditions well matched with the actual snow properties. Thus, the precision of predicting the tire performance on a road surface can be improved. Thus, the tire designing-evaluation cycle can be efficiently performed by using such a tire performance prediction method.

(5) Other Embodiments

As described above, the details of the present invention have been disclosed by using the embodiment of the present invention. However, it should not be understood that the description and drawings which constitute part of this disclosure limit the present invention. From this disclosure, various alternative embodiments, examples, and operation techniques will be easily found by those skilled in the art.

For example, although the snow model 310 is created by an indoor test using snow alone in the above-described embodiment, the snow model 310 does not necessarily have to be created through an indoor test using snow alone.

As described above, the present invention naturally includes various embodiments which are not described herein. Accordingly, the technical scope of the present invention should be determined only by the matters to define the invention in the scope of claims regarded as appropriate based on the description.

This application claims the benefit of priority from Japanese Patent Application No. 2010-166096 (filed on Jul. 23, 2010), the contents of which are incorporated herein by reference.

INDUSTRIAL APPLICABILITY

According to the characteristics of the present inventions, a tire performance prediction method which can improve the precision of predicting tire performance on a snowy road surface and allow efficient tire designing-evaluation cycle can be provided. In addition, a method of designing tire using the tire performance prediction method can also be provided.

The invention claimed is:
1. A tire performance prediction method of predicting performance of a tire on a snowy road surface based on a physical quantity generated in at least any one of a tire model and a snow model, by using the tire model having a tread pattern deformable by at least one of ground contact and rolling and a snow model representing the snowy road surface to be in contact with the tire model, wherein
the snow model is modeled as an elasto-plastic body or a plastic model,
the snow model represents non-linearity of a volume compaction property of snow by a relation between a density of the snow or a volume strain of the snow and a pressure on the snow,
the snow model represents a shear property of the snow by a relation between a yield stress of the snow and the pressure on the snow, and
in the snowy-road-surface model represented by the snow model, the non-linearity of the volume compaction property of the snow is expressed as a piecewise-linear continuous function which is based on the relation between the density of the snow or the volume strain of the snow and the pressure on the snow, wherein the piecewise-linear continuous function is sectioned in a unit of 0.1 MPa or smaller in a section where a stress of 0.5 MPa or smaller is applied to snow, and the piecewise-linear continuous function is sectioned in a unit of 0.3 MPa or smaller in a section where a stress if larger than 0.5 MPa is applied to snow.

2. The tire performance prediction method according to claim 1, wherein in the snowy-road-surface model represented by the snow model, the shear property of the snow is expressed as a linear function based on the relation between the yield stress of the snow and the pressure on the snow.

3. The tire performance prediction method according to claim 1, wherein the snow model is created by the steps of:
stratifying a snow alone according to at least one of a hardness of the snow alone and a temperature of the snow alone, under a test condition which allows a deformation speed of snow to be substantially the same as that in a tire use condition through an indoor test of snow alone; and determining parameters for specifying the volume compaction property and the shear property of the snow by using the stratified snow alone.

4. The tire performance prediction method according to claim 3, wherein in the step of stratifying the snow alone, tomographic images of the snow alone taken by an internal three-dimensional image analysis device and three-dimensional information which is a result of processing on the tomographic images are used as a microscopic structure of the snow alone.

5. A method of designing tire comprising the steps of:
predicting performance of a tire on a snowy road surface through numerical analysis by using the tire performance prediction method according to claim 1;

modifying a design draft of the tire targeted for the tire performance prediction method, based on the predicted tire performance; and re-predicting performance of a tire, which is based on the modified design draft, on the snowy road surface through numerical analysis.

6. The tire performance prediction method according to claim 3, wherein in the step of stratifying the snow alone only according to the hardness of the snow alone and the temperature of the snow alone, under the test condition which allows the deformation speed of snow to be substantially the same as that in the tire use condition through the indoor test of snow alone.

* * * * *